(12) United States Patent
Madnani et al.

(10) Patent No.: US 9,342,499 B2
(45) Date of Patent: May 17, 2016

(54) ROUND-TRIP TRANSLATION FOR AUTOMATED GRAMMATICAL ERROR CORRECTION

(71) Applicant: Educational Testing Service, Princeton, NJ (US)

(72) Inventors: Nitin Madnani, Princeton, NJ (US); Joel Tetreault, San Francisco, CA (US); Martin Chodorow, New York, NY (US)

(73) Assignee: Educational Testing Service, Princeton, NJ (US)

( * ) Notice: Subject to any disclaimer, the term of this patent is extended or adjusted under 35 U.S.C. 154(b) by 25 days.

(21) Appl. No.: 14/219,671

(22) Filed: Mar. 19, 2014

(65) Prior Publication Data

US 2014/0288915 A1  Sep. 25, 2014

Related U.S. Application Data

(60) Provisional application No. 61/803,152, filed on Mar. 19, 2013.

(51) Int. Cl.
  *G06F 17/28* (2006.01)
  *G06F 17/27* (2006.01)

(52) U.S. Cl.
  CPC ............ *G06F 17/274* (2013.01); *G06F 17/289* (2013.01)

(58) Field of Classification Search
  CPC ... G06F 17/289; G06F 17/28; G06F 17/2785; G06F 17/2705; G06F 17/27; G06F 17/271; G06F 17/274; G06F 17/2854; G06F 17/275; G06F 17/2765; G06F 17/2818; G06F 17/2836; G10L 15/005
  USPC ...................................................... 704/1–10
  See application file for complete search history.

(56) References Cited

U.S. PATENT DOCUMENTS

2004/0167768 A1* 8/2004 Travieso et al. .................. 704/2
2014/0337007 A1* 11/2014 Waibel et al. ..................... 704/3

FOREIGN PATENT DOCUMENTS

WO  2013/064752 A2  5/2013
WO  WO 2013064752 A2 *  5/2013

OTHER PUBLICATIONS

Hermet, Matthieu, Desilets, Alain; Using First and Second Language Models to Correct Preposition Errors in Second Language Authoring; Proceedings of the 4th Workshop on Innovative Use of NLP for Building Educational Applications; pp. 64-72; 2009.
Madnani, Nitin, Tetreault, Joel, Chodorow, Martin; Exploring Grammatical Error Correction with Not-So-Crummy Machine Translation; 7th Workshop on the Innovative Use of NLP for Building Educational Applications; Montreal, Canada; pp. 44-53; Jun. 2012.

* cited by examiner

*Primary Examiner* — Marivelisse Santiago Cordero
*Assistant Examiner* — Stephen Brinich
(74) *Attorney, Agent, or Firm* — Jones Day

(57) ABSTRACT

Systems and methods are provided for correcting a grammatical error in a text sequence. A first text sequence in a first language is received. The first text sequence is translated to a second language to provide a first translated text. The first text sequence is translated to a third language to provide a second translated text. The third language is different from the second language. The first translated text is translated to the first language to provide a first back translation. The second translated text is translated to the first language to provide a second back translation. A plurality of candidate text sequences that include features of the first back translation and the second back translation are determined. The plurality of candidate text sequences include alternative grammatical options for the first text sequence. The plurality of candidate text sequences are scored with the processing system.

21 Claims, 9 Drawing Sheets

| Original | Both experience and books are very important *about living*. |
|---|---|
| Swedish | Both experience and books are very important in live. |
| Italian | Both books are very important experience and life. |
| Russian | And the experience, and a very important book about life. |
| French | Both experience and the books are very important in life. |
| German | Both experience and books are very important about life. |
| Chinese | Related to the life experiences and the books are very important. |
| Spanish | Both experience and the books are very important about life. |
| Arabic | Both experience and books are very important for life. |

FIG. 2

| | |
|---|---|
| Original (O) | Both experience and books are very important *about living.* |
| Baseline LM (B) | And the experience, and a very important book about life. |
| Greedy (G) | Both experience and books are very important about life. |
| 1-best (1) | Both experience and the books are very important about life. |
| LM Re-ranked (L) | And the experience and the books are very important in life. |
| Product Re-ranked (P) | Both experience and books are very important about life. |
| LM Composition (C) | Both experience and books are very important in life. |

FIG. 6

ROUND-TRIP TRANSLATION FOR AUTOMATED GRAMMATICAL ERROR CORRECTION

CROSS-REFERENCE TO RELATED APPLICATIONS

This application claims priority to U.S. Provisional Patent Application No. 61/803,152, filed Mar. 19, 2013, entitled "Round Trip Machine Translation for Grammatical Error Correction," which is herein incorporated by reference in its entirety.

FIELD

The technology described in this patent document relates generally to computer-based grammatical error correction and more particularly to the use of round-trip translations for automatically correcting a grammatical error in a text sequence.

BACKGROUND

Worldwide, there are an estimated 750 million people who use English as a second language, as compared to 375 million native English speakers. In addition, in the United States alone, there are an estimated 4 to 5 million students with limited English proficiency in public schools, as well as a large number of international students in American colleges and universities. These numbers highlight a growing need for support for non-native speakers of English who must perform academically in English, though their English language proficiency may be limited. There are several different types of errors that non-native speakers may make, some of which include grammatical errors. Although such grammatical errors can be detected and corrected manually by humans, a length of time required to perform the detection and correction may be considerable.

SUMMARY

The present disclosure is directed to a computer-implemented method, system, and non-transitory computer-readable storage medium for correcting a grammatical error in a text sequence. In an example computer-implemented method of correcting a grammatical error in a text sequence, a first text sequence in a first language is received. The first text sequence is translated to a second language with a processing system to provide a first translated text. The first text sequence is translated to a third language with the processing system to provide a second translated text, where the third language is different from the second language. The first translated text is translated back to the first language with the processing system to provide a first back translation. The translating of the first translated text back to the first language is performed without reference to the first text sequence. The second translated text is translated back to the first language with the processing system to provide a second back translation. The translating of the second translated text back to the first language is performed without reference to the first text sequence. A plurality of candidate text sequences that include features of the first back translation and the second back translation are determined with the processing system. The plurality of candidate text sequences include alternative grammatical options for the first text sequence. Each of the plurality of candidate text sequences is scored with the processing system, where the scoring provides a measure of a grammaticality of each of the candidate text sequences.

An example system for correcting a grammatical error in a text sequence includes a data processor and a computer-readable memory in communication with the data processor. The computer-readable memory is encoded with instructions for commanding the data processor to execute steps. In executing the steps, a first text sequence in a first language is received. The first text sequence is translated to a second language with the data processor to provide a first translated text. The first text sequence is translated to a third language with the data processor to provide a second translated text, where the third language is different from the second language. The first translated text is translated back to the first language with the data processor to provide a first back translation. The translating of the first translated text back to the first language is performed without reference to the first text sequence. The second translated text is translated back to the first language with the data processor to provide a second back translation. The translating of the second translated text back to the first language is performed without reference to the first text sequence. A plurality of candidate text sequences that include features of the first back translation and the second back translation are determined with the data processor. The plurality of candidate text sequences include alternative grammatical options for the first text sequence. Each of the plurality of candidate text sequences is scored with the processing system, where the scoring provides a measure of a grammaticality of each of the candidate text sequences.

In an example non-transitory computer-readable storage medium for correcting a grammatical error in a text sequence, the computer-readable storage medium includes computer executable instructions which, when executed, cause a processing system to execute steps. In executing the steps, a first text sequence in a first language is received. The first text sequence is translated to a second language with the processing system to provide a first translated text. The first text sequence is translated to a third language with the processing system to provide a second translated text, where the third language is different from the second language. The first translated text is translated back to the first language with the processing system to provide a first back translation. The translating of the first translated text back to the first language is performed without reference to the first text sequence. The second translated text is translated back to the first language with the processing system to provide a second back translation. The translating of the second translated text back to the first language is performed without reference to the first text sequence. A plurality of candidate text sequences that include features of the first back translation and the second back translation are determined with the processing system. The plurality of candidate text sequences include alternative grammatical options for the first text sequence. Each of the plurality of candidate text sequences is scored with the processing system, where the scoring provides a measure of a grammaticality of each of the candidate text sequences.

BRIEF DESCRIPTION OF THE DRAWINGS

FIG. 2 depicts a plurality of back translations for an original sentence in a first language.

FIG. 6 depicts a plurality of candidate text sequences for an original sentence, where the original sentence includes one or more grammatical errors.

DETAILED DESCRIPTION

Figure 1:
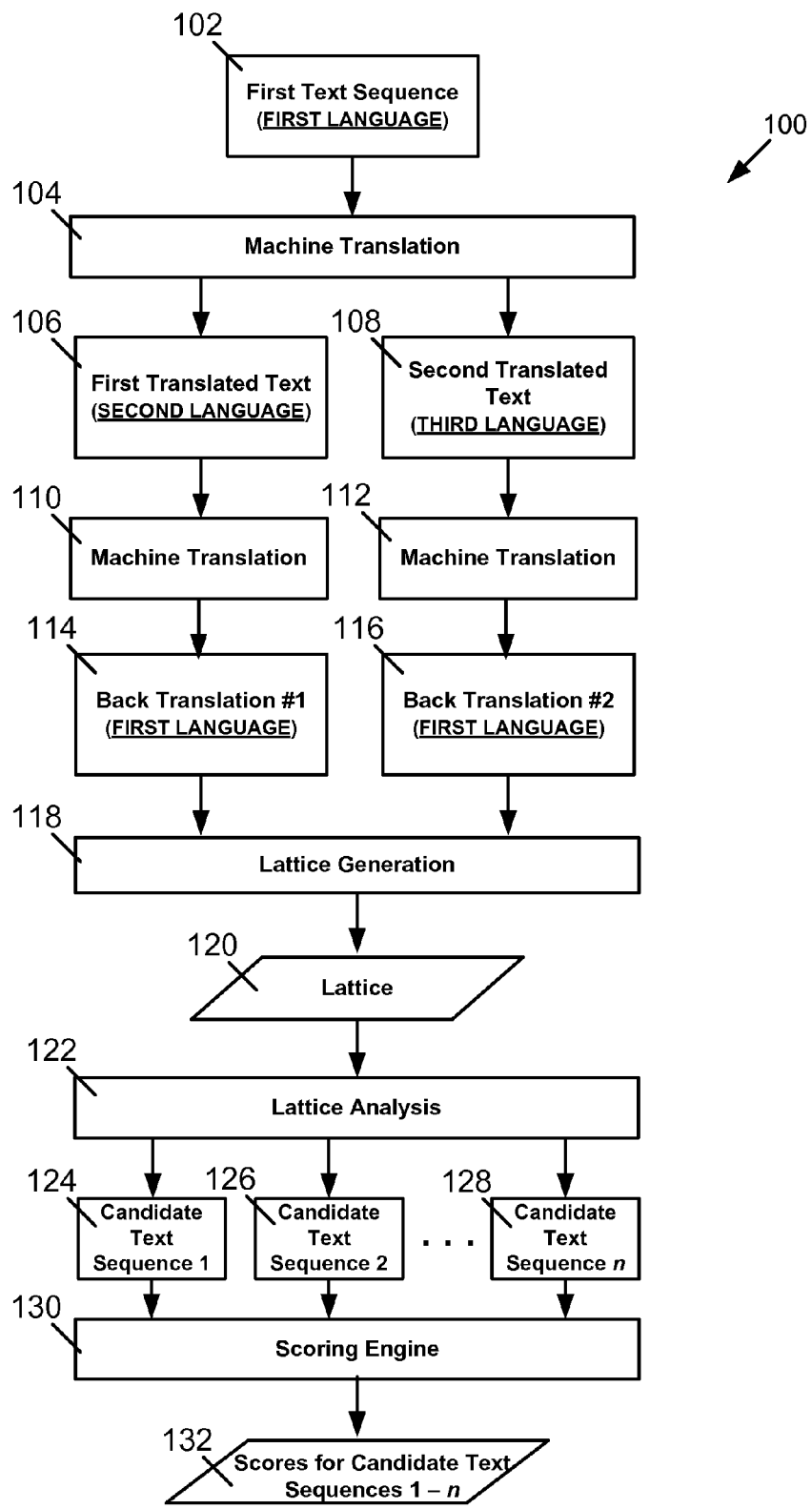
FIG. 1 is a block diagram illustrating an example system for correcting one or more grammatical errors in a text sequence.

FIG. 1 is a block diagram 100 illustrating an example computer-based system for correcting one or more grammatical errors in a first text sequence 102. To correct the one or more grammatical errors in the first text sequence 102, the example system of FIG. 1 comprises a computer-based system that automatically detects and corrects grammatical errors in the first text sequence 102. In an example, the first text sequence 102 is a sentence, such that the computer-based system provides whole-sentence grammatical error correction by processing the first text sequence according to a number of steps, generating a plurality of candidate text sequences 124, 126, 128, and outputting and/or scoring the candidate text sequences 124, 168 and 128, a highest scoring one of which may be selected as the corrected text sequence, for example. In the example, the plurality of candidate text sequences 124, 126, 128 are sentences that represent the first text sequence 102, each with one or more changes to correct the one or more grammatical errors.

As described in greater detail below, the candidate text sequences 124, 126, 128 are generated based in part on round-trip language translations of the first text sequence 102 into (and back from) multiple different languages using machine translations, i.e., translations of text using a computer-based translation algorithm with a computer processing system. A round-trip translation (which may also be referred to as "bidirectional translation" or "back-and-forth" translation) involves conducting a machine translation of a sequence of text from a first language to a second language (the second language may be referred to as a "pivot language"), and then conducting a machine translation of the initially translated text in the second language back to the first language. The translation of the sequence of text in the second language back to the first language is performed without reference to the original sequence of text. In other words, the "back translation" of text back from the second language to the first language is not simply a reversal of steps that undoes the original translation. Rather, the machine translation algorithm for translating text from the first language to the second language utilizes an independent algorithm compared to the algorithm for translating text from the second language to the first language. Thus, an example round-trip translation includes translating an original sentence in English to French, and then translating the sentence in French back to English, where the French to English translation is performed without reference to the original English sentence. The machine translation algorithm for translating French to English is an independent algorithm compared to that for translating text from English to French.

With reference again to FIG. 1, the first text sequence 102 is in a first language. Although the first text sequence 102 comprises a sentence in the example noted above, in other examples, the first text sequence 102 could be a phrase, a group of sentences, or a text sequence of any other size or type. The first text sequence 102 is received at a machine translation module 104 of the computer-based system. The machine translation module 104 is implemented in the computer-based system with hardware and/or software to automatically translate text or speech from one natural language to another. The translations are automatic in the sense that the translations are carried out by the translation algorithm(s) without the need for human decision making regarding substantive aspects of the translations during the translations. Specifically, in the example of FIG. 1, the machine translation module 104 is used to translate the first text sequence 102 (e.g., in English) to a second language (e.g., French) to provide a first translated text 106. Similarly, the machine translation module 104 is used to translate the first text sequence 102 (e.g., in English) to a third language (e.g., Spanish) to provide a second translated text 108. The third language is different from the second language.

The first and second translated texts 106, 108 are received at machine translation modules 110, 112, which may be part of the same computer application or a different computer application from that which embodies the machine translation module 104 described above. The machine translation modules 110, 112 utilize automated, computer-based machine translation techniques to generate a first back translation 114 and a second back translation 116. Specifically, the machine translation module 110 translates the first translated text 106 from the second language back to the first language to generate the first back translation 114. The first back translation 114 is thus an example of a round-trip (i.e., bidirectional) translation, where the first text sequence 102 is translated to the second language to provide the first translated text 106, and the first translated text 106 is translated back to the first language to provide the first back translation 114. In a similar manner, the machine translation module 112 translates the second translated text 108 from the third language back to the first language to generate the second back translation 116.

The translation of the first translated text 106 back to the first language is performed without reference to the first text sequence 102, and similarly, the translation of the second translated text 108 back to the first language is performed without reference to the first text sequence 102. In this regard, the generation of the back translations 114, 116 involves different algorithms, e.g., utilizing different rule sets or statistical models than those that are used to translate the first text sequence 102 to the second and third languages. As an example, the translation of the first text sequence 102 to the second language to generate the first translated text 106 utilizes a first rule set or statistical model, where the first rule set or statistical model is configured specifically for translating text from the first language to the second language. By contrast, the translation of the first translated text 106 back to the first language to generate the first back translation 114 utilizes a second rule set or statistical model, where the second rule set or statistical model is configured specifically for translating text from the second language to the first language. The first and second rule sets or statistical models are configured to perform different types of translations (i.e., translations involving different starting and ending languages) and thus differ from each other.

Likewise, the translation of the first text sequence 102 to the third language to generate the second translated text 108 utilizes a third rule set or statistical model (i.e., configured specifically for translating text from the first language to the third language), and the translation of the second translated text 108 back to the first language to generate the second back translation 116 utilizes a fourth rule set or statistical model (i.e., configured specifically for translating text from the third language to the first language). Because the back translations 114, 116 are generated without reference to the first text sequence 102 and use different rule sets or statistical models than those used in the forward translations, the back translations 114, 116 may differ from the first text sequence 102, even though they are now all in the same (original) language.

As noted above, the third language is different from the second language, such that in providing the first and second back translations 114, 116, a plurality of pivot languages are used. Although two pivot languages are used in the example of FIG. 1 (i.e., the second language and the third language), in other examples, additional pivot languages are used in connection with carrying out additional translations of the first text sequence 102. In one example, the first text sequence 102 is in English, and eight (8) pivot languages are used (e.g., Arabic, Chinese, Spanish, French, Italian, German, Swedish, Russian). As described in greater detail below, the example system of FIG. 1 combines evidence present in the multiple back translations 114, 116 to correct the one or more grammatical errors in the first text sequence 102.

In one example, to combine the evidence present in the first and second back translations 114, 116, a lattice (or diagram) generation module 118 may be utilized. The lattice (or diagram) generation module 118 constructs a lattice (or diagram) 120 that includes features of the first and second back translations 114, 116. In an example, the lattice (or diagram) 120 generated by the lattice generation module 118 is a data structure that compactly encodes sequences of words (e.g., sequences of words from the first sequence 102 and sequences of words from the first and second back translations 114, 116) along with a likelihood that one word follows another in a text sequence in the first language. Such data structures may be visualized as graphical constructs where circles or other shapes represent nodes of the lattice (or diagram) and where arrows or lines represent edges connecting the nodes. An example is shown for lattice 400 of FIG. 4, which represents, in this example, a lattice combining the attributes of the first text sequence 102 and only one back translation from the Russian pivot language, for simplicity of illustration. However, it should be appreciated that a data structure referred to as a lattice or diagram herein need not be graphically illustrated, displayed or reproduced (e.g., printed) in order to be considered a lattice or diagram. To facilitate the description, a lattice or diagram as referred to herein may refer to either the underlying data structure or the graphical visualization, display or reproduction, or both.

More generally, a given lattice diagram will include text features from the first text sequence 102 (in the first language) and multiple back translations (each in the first language) using multiple pivot languages. Each node of a lattice includes a unit of text (e.g., a word, phrase, punctuation, contiguous sequence of words, etc.) of the first text sequence 102, the first back translation 114, the second back translation 116, and any additional back translations, and the edges connect each node to one or more other nodes. As described in greater detail below with reference to FIGS. 3-5, the lattice 120 may be constructed based on an alignment procedure, whereby units of text in the first text sequence 102 are aligned with corresponding units of text in the first and second back translations 114, 116. The aligning of the units of text within the first text sequence 102 and the first and second back translations 114, 116 defines alternative formulations for units of text of the first text sequence 102. Such alternative formulations are added as nodes on the lattice 120 and thus define alternative paths of the lattice 120. In one example, the various alternative paths of the lattice 120 yield different renderings of the first text sequence 102 after forward and back translation using different pivot languages. In the example, these different renderings represent various candidates of the original text sequence for which any grammatical errors in the original text sequence may have been remedied. One or more of the candidate text sequences may be chosen, e.g., the one or two that are determined to be most fluent, and a selected candidate text sequence (selected rendering) may represent the first text sequence 102 with one or more changes to correct the grammatical errors. Any suitable diagrammatic analysis algorithm(s) may be used to identify the various nodal and edge-connection options represented by multiple back translations of the first text sequence 102. Each of the back translations of the first text sequence 102 represents a possible path through the lattice, but there may be additional paths through the lattice that are not identical to any of the back translations of the first text sequence 102.

The lattice 120 generated by the lattice generation module 118 is received at a lattice analysis module 122, and the lattice analysis module 122 determines a plurality of paths through the lattice 120. Each path of the plurality of paths represents a candidate text sequence of the first text sequence 102, and each candidate text sequence includes alternative grammatical options for the first text sequence 102. It should be understood that the number of paths through the lattice may be greater than the number of pivot languages, i.e., greater than the number of back translations. Thus, FIG. 1 depicts n candidate text sequences 124, 126, 128, where each candidate text sequence presents a variation of the first text sequence 102 with one or more changes thereto, which may reflect corrections of the one or more grammatical errors of the first text sequence 102. Example candidate text sequences are depicted in FIG. 6 and discussed in further detail below with reference to that figure. In determining the plurality of paths through the lattice 120 that define the candidate text sequences 124, 126, 128, various statistical measures, non-statistical measures, and natural language processing techniques may be used. In an example, a path of the lattice 120 used in generating a candidate text sequence is a path that represents a shortest path through the lattice 120. As another example, a path of the lattice 120 used in generating another candidate text sequence is determined by selecting at each node of the lattice 120 an outgoing edge with a largest weight. Edge weights for the lattice can be chosen in any suitable manner as will be recognized by those of ordinary skill in the art. In some examples, edges can be weighted according to their relative prevalence at a given location in the lattice among the available options. In another example, edges can be weighted according to prevalence with respect how prevalent a given word sequence (e.g., 2-gram, 3-gram, etc.) containing the edge is found in any suitable reference corpus. In other examples, all edges may be weighted equally.

The candidate text sequences 124, 126, 128 are received at a scoring engine 130 of the computer-based system such that the scoring is carried out by a computer processing system. The scoring engine 130 may comprise an automated scoring system configured to determine scores 132 for each of the candidate text sequences, where the scores 132 may be based on a number of grammatical errors included in the candidate text sequences 124, 126, 128 or other measures (e.g., a measure of the fluency of the candidate text sequences 124, 126, 128). The scores 132 thus provide a measure of the grammaticality (e.g., grammatical correctness) of each of the candidate text sequences 124, 126, 128. In an example, the automated scoring system may be a computer-based system for automatically scoring the candidate text sequences 124, 126, 128. The scoring is automatic in the sense that the scoring is carried out by a scoring algorithm(s) without the need for human decision making regarding substantive aspects of the scoring during the computer-based scoring process. The scoring engine 130 may determine the scores 132 for the candidate text sequences 124, 126, 128 based on various features extracted from the candidate text sequences 124, 126, 128 and a scoring model.

A suitable scoring model for scoring the candidate text sequences determined from the multiple back translations may be generated in various ways. In an example, a corpus-based statistical model may be used, wherein the model has been trained on a large corpus of reference text (deemed to be suitable for training), the training involving the extraction and counting of sequences of adjacent word and part-of-speech pairs (bigrams) to determine a set of statistics against which the scoring model can score the candidate text sequences. In this regard, the scoring model may identify multiple bigrams from each candidate text sequence and then identify those bigrams that occur infrequently in the corpus. For a given candidate text sequence, each bigram of that candidate text sequence can be checked against the corpus statistics for that same bigram, and if that bigram occurs infrequently in the corpus, e.g., below a threshold frequency, that bigram can be flagged, e.g., counted, for that text sequence. The total number of bigrams in a given text sequence that fall below a threshold frequency can be the score for that candidate text sequence. For instance, if there are 12 bigrams in a given text sequence and the corpus statistics for three of them are below a predetermined frequency threshold, the score could be registered as "3." Further, that score may be viewed as a raw score that can be further processed into a normalized score based on a suitable normalization, e.g., based on the length of the candidate text sequence. In this example, relatively lower scores would be relatively more grammatically correct, and in one example, the lowest scoring candidate could be selected as the best choice, i.e., the one that most likely corrects the grammatical error(s) in the first (original) text sequence. Alternatively, the corpus statistics could be used in a linear scoring model wherein bigrams that have high frequencies of occurrence in the corpus are given large weights. In this example, a given bigram that occurs in a given text sequence may be given a subscore equal to the number of times that the given bigram occurs in the candidate text sequence multiplied by the weight for that bigram. The subscores for each bigram in that candidate text sequence can be added to provide the overall score for that candidate text sequence. In this example, relatively higher scores would be relatively more grammatically correct, and in one example, the highest scoring candidate could be selected as the best choice, i.e., the one that most likely corrects the grammatical error(s) in the first (original) text sequence. In other examples, each of these scoring models could be extended to go beyond bigrams so as to also include scoring for trigrams in each candidate text sequence, for instance, in which case the scoring models would need to be trained to include the statistics for trigrams from the corpus.

The example system of FIG. 1 does not target specific error types and rather uses the combination of evidence from multiple round trip translations, e.g., the first and second round-trip translations 114, 116, to correct all types of grammatical errors included in the first text sequence 102. The example system of FIG. 1 may thus be able to correct complex, compound errors in the first text sequence 102 (e.g., compounded errors of style and grammar, etc.). In examples where the first text sequence 102 is a sentence, the example system of FIG. 1 is configured to provide whole-sentence grammatical error correction of all types of grammatical errors. In addition to providing grammar correction for the first text sequence 102 as described above, it should be understood that the example system described herein can also process a second text sequence, a third text sequence, and so on for grammar correction.

FIG. 2 depicts a plurality of back translations for an original sentence in a first language. As described above with reference to FIG. 1, automated, computer-based machine translation techniques are used to generate a plurality of back translations based on multiple pivot languages. Specifically, in the example of FIG. 2, computer-based machine translation algorithms are used to translate the original sentence in English to a plurality of different languages. In FIG. 2, the different languages into which the original sentence is translated include Swedish, Italian, Russian, French, German, Chinese, Spanish, and Arabic. The translations in these eight different languages are then translated back to the first language, English, to generate the first back translations illustrated in FIG. 2. As described above with reference to FIG. 1, the translating of the sentence back to English is performed without reference to the original sentence. That is, the machine translation algorithms for the forward translations are independent of the machine translation algorithms for the back translations. Other pivot languages may be used in other examples, and other examples may include a greater number of pivot languages or a smaller number of pivot languages (e.g., two pivot languages, as in the example of FIG. 1).

As an example of the machine translation performed to generate the plurality of back translations illustrated FIG. 2, in generating the "Chinese" back translation, the original sentence in English is translated to Chinese, and the resulting Chinese sentence is then translated back to English. In translating the Chinese sentence back to English, the translation is performed without reference to the original sentence. The round-trip translations in FIG. 2 may thus define alternative formulations of the original sentence. In an example, the translations may be generated using any suitable machine translation algorithms, such as, for example, the "Google Translate" application programming interface (API) known to those of ordinary skill in the art. In other examples, various other statistical machine translation (SMT) systems or techniques may be used, such as the "Moses" and "Joshua" SMT systems known to those of ordinary skill in the art. The Google Translate API and other systems utilize SMT approaches to generate translations on the basis of statistical models whose parameters are derived from an analysis of multi-lingual text corpora. In other examples, the machine translation performed in the system described herein may utilize a rule-based approach to machine translation.

The original sentence of FIG. 2 includes one or more grammatical errors and reads as follows: "Both experience and books are very important about living." In this original sentence, the portion of the sentence "about living" includes the one or more grammatical errors (i.e., without the one or more grammatical errors, the sentence may read, "Both experience and books are very important in life."). As illustrated in FIG. 2, the Swedish back translation reads: "Both experience and books are very important in live." The Italian back translation reads: "Both books are very important experience and life." The Russian back translation reads: "And the experience, and a very important book about life." The French back translation reads: "Both experience and the books are very important in life." The German back translation reads: "Both experience and books are very important about life." The Chinese back translation reads: "Related to the life experiences and the books are very important." The Spanish back translation reads: "Both experience and the books are very important about life." The Arabic back translation reads: "Both experience and books are very important for life."

In an example, a correction of the original sentence of FIG. 2 may be determined by selecting a most fluent back translation of the eight back translations generated by the machine translation system. For example, the most fluent back translation may be determined using an n-gram language modeling technique. Specifically, in an example, a 5-gram model (i.e., an n-gram model with n=5) trained on an English gigaword corpus is used to select a most fluent back translation of the eight back translations. In other examples described in greater detail below, however, the correction of the original sentence is determined by combining features included in multiple of the different back translations. In such other examples, the correction may be equivalent to none of the back translations.

Figure 3:
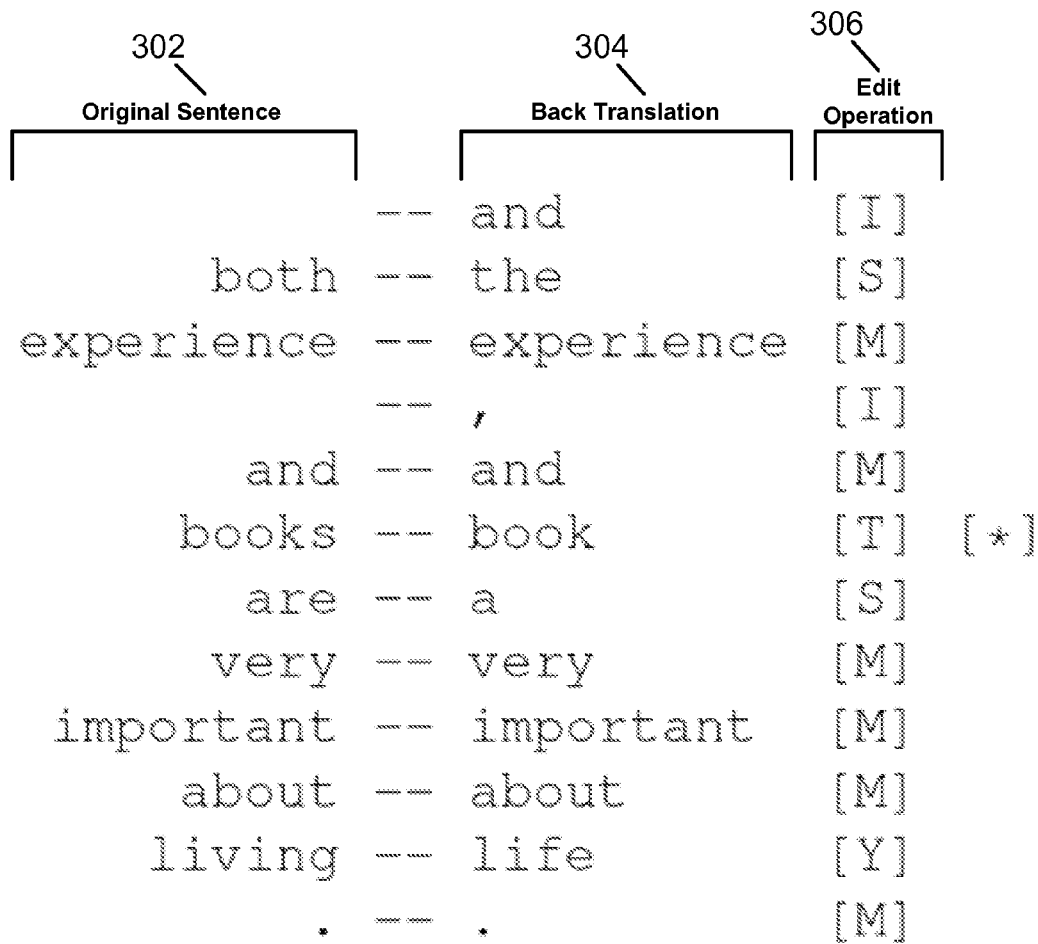
FIG. 3 depicts an alignment procedure performed between an original sentence and a back translation.

FIG. 3 depicts an alignment procedure performed between an original sentence 302 and a back translation 304. As described above with reference to FIG. 1, in correcting one or more grammatical errors in a text sequence, a lattice is constructed. The lattice combines features of multiple back translations (e.g., first and second back translations 114, 116 of FIG. 1, the eight example back translations of FIG. 2, etc.) and may be constructed based on an alignment procedure. In the alignment procedure, units of text in the original text sequence are aligned with corresponding units of text in the multiple back translations. FIG. 3 depicts aspects of such an alignment procedure. The original sentence 302 of FIG. 3 represents a first text sequence in a first language that includes one or more grammatical errors. Specifically, the original sentence 302 utilizes the original sentence of FIG. 2 (i.e., "Both experience and books are very important about living."). The back translation 304 aligned to the original sentence 302 in FIG. 3 is the Russian back translation of FIG. 2 (i.e., "And the experience, and a very important book about life.").

In the alignment procedure, for each unit of text of the original sentence 302 (e.g., each word and punctuation mark), a corresponding unit of text is determined in the back translation 304. In an example, to automatically align the original sentence 302 and the back translation 304 (i.e., without human intervention or requiring only minimal human intervention), a machine translation metric is used. The machine translation metric may consider the original sentence 302 and the back translation 304 and determine a least number of edit operations that can be employed on the back translation 304 to transform the back translation 304 into the original sentence 302. Various other automated procedures for determining corresponding units of text in the original sentence 302 and the back translation 304 may be used in other examples.

In an example, the Ter-Plus (TERp) machine translation metric known to those of ordinary skill in the art may be utilized in aligning an original sentence 302 and a back translation 304. Applied in this way, the TERp metric processes the original sentence 302 and the back translation 304 and determines a least number of edit operations that can be employed on the back translation 304 to transform the back translation 304 into the original sentence 302. Using the TERp metric, in determining the least number of edit operations, an alignment is produced between the original sentence 302 and the back translation 304, such that for each unit of text in the original sentence 302, a corresponding unit of text in the back translation 304 is determined. As depicted in the example alignment of FIG. 3, in determining the corresponding units of text in the back translation 304, an order of words or phrases in the back translation 304 may be shifted in order to allow for a better alignment with the original sentence 302 or to obtain a smaller edit cost, as determined by the TERp metric. For instance, as indicated by the asterisk near the word "book" of the back translation 304, the word "book" is placed in a different location in the aligned back translation 304 as compared to the Russian back translation shown in FIG. 2.

In FIG. 3, each alignment link between the original sentence 302 and the back translation 304 is associated with an edit operation 306. The edit operations 306 of FIG. 3 include the edit operations considered in the TERp metric (i.e., those edit operations considered in the TERp metric in determining the least number of edit operations that can be employed to transform the back translation 304 into the original sequence 302). Specifically, the edit operations considered by the TERp metric may include matches (denoted by the letter "M" in the edit operations 306 of FIG. 3), substitutions (denoted by the letter "S"), insertions (denoted by the letter "I"), deletions (not depicted in the example alignment procedure of FIG. 3), paraphrase substitutions (not depicted in the example alignment procedure of FIG. 3), synonym matches (denoted by the letter "Y" in FIG. 3), and stem matches (denoted by the letter "T"). Additionally, in FIG. 3, the asterisk next to the word "book" denotes that the TERp metric shifted the position of the word "book" before computing an edit operation for the word.

The match operation in TERp is used to indicate an exact, identical match between the original sentence 302 and the back translation 304. For example, in FIG. 3, the word "experience" from the original sentence 302 exactly matches the word "experience" from the back translation 304. The substitution operation in TERp substitutes a word of the original sentence 302 with a different word of the back translation 304. In FIG. 3, for instance, the word "the" from the back translation 304 is substituted for the word "both" of the original sentence 302. The insertion operation in TERp causes the back translation 304 to have an additional unit of text that does not correspond to a unit of text of the original sentence 302. In FIG. 3, the word "and" at the beginning of the back translation 304 does not have a corresponding unit of text in the original sentence 302. The deletion operation in TERp deletes a unit of text of the original sentence 302, such that the deleted unit of text is not aligned to a unit of text in the back translation 304.

The paraphrase substitution operation in TERp (also known as a "phrase substitution") aligns units of text in the original sentence 302 and the back translation 304 if the units of text are paraphrases of each other. The synonym match operation in TERp aligns units of text in the original sentence 302 and the back translation 304 if the units of text are synonyms of each other. In FIG. 3, for instance, the words "living" and "life" from the original sentence 302 and the back translation 304, respectively, are determined to be synonyms and are thus aligned based on the synonym match operation. The stem match operation in TERp aligns units of text in the original sentence 302 and the back translation 304 if the units of text share a same stem. In FIG. 3, for instance, the words "books" and "book" from the original sentence 302 and the back translation 304, respectively, are determined to share a same stem and are thus matched based on the stem match operation.

In examples where alignment links between the original sentence and the back translation are defined by edit operations (e.g., the edit operations 306 in FIG. 3), different types of edit operations not described above may be used. For instance, in other examples, fewer or additional types of edit operations may be used in performing the alignment procedure. In an example, only match operations, insertion operations, deletion operations, and substitution operations may be used. Additionally, as explained above, various other systems and algorithms for automatically determining corresponding units of text in the original sentence 302 and the back translation 304 are used in other examples. Such other systems and algorithms may make alignment decisions based on criteria other than the edit operations described above.

Figure 4:
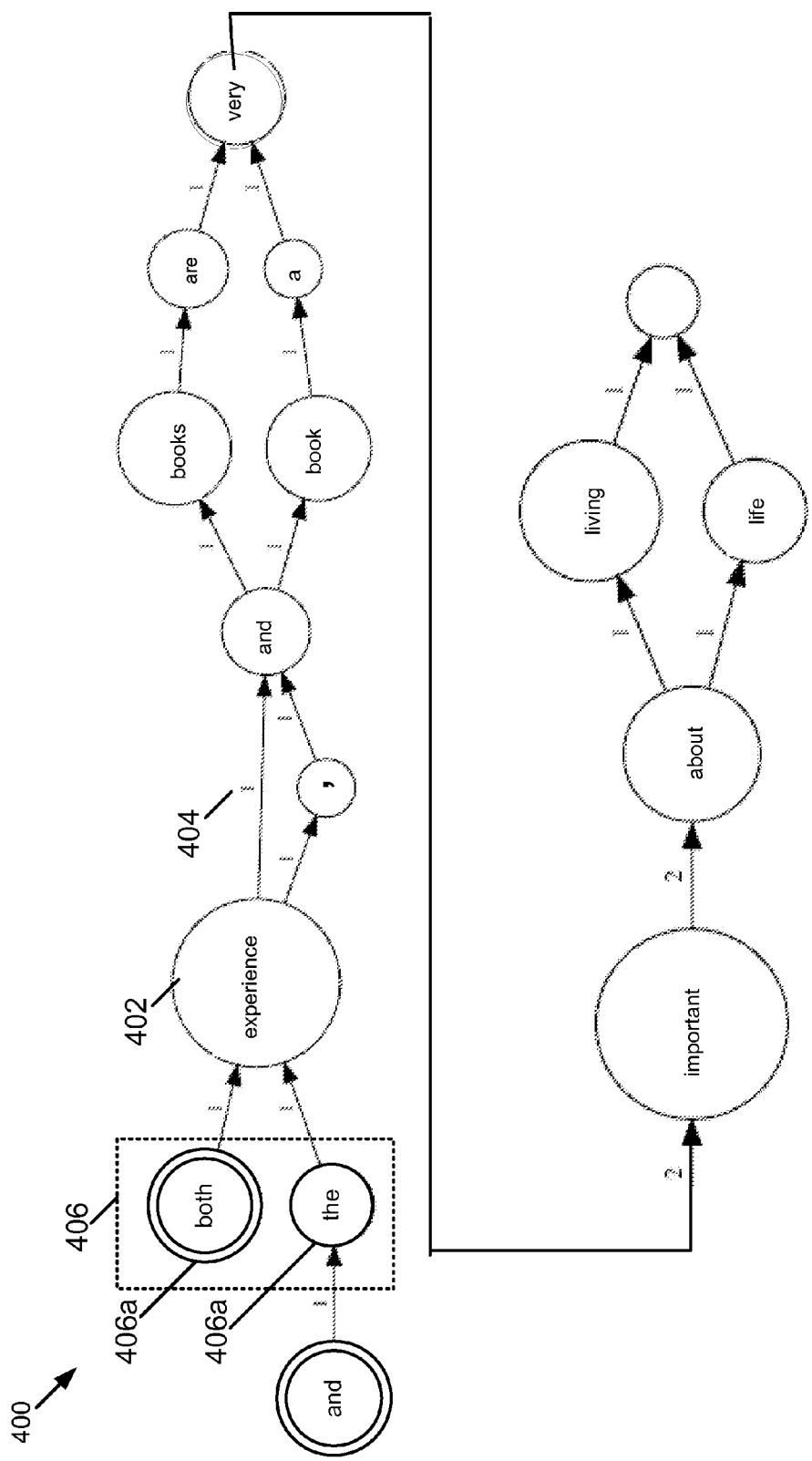
FIG. 4 depicts an example lattice including a first path and a plurality of nodes that have been added to the first path based on an alignment between an original sentence and a back translation.

FIG. 4 depicts an example lattice 400 including a first path and a plurality of nodes that have been added to the first path based on an alignment between an original sentence and a back translation. As described above, in order to generate a correction for a text sequence that corrects the grammatical errors of the text sequence, evidence present in the multiple back translations may be combined via a lattice. The lattice (e.g., constructed via the lattice generation module 118 of FIG. 1) thus includes features of the multiple different back translations, where the multiple different back translations have been generated using the plurality of different pivot languages (e.g., Swedish, Italian, Russian, French, German, Chinese, Spanish, Arabic), as described above. FIG. 4 depicts the example lattice 400 including nodes (e.g., node 402) and edges (e.g., edge 404). Each node includes a unit of text from the original sentence or a back translation, and the edges connect each node to one or more other nodes of the lattice 400.

Figure 5:
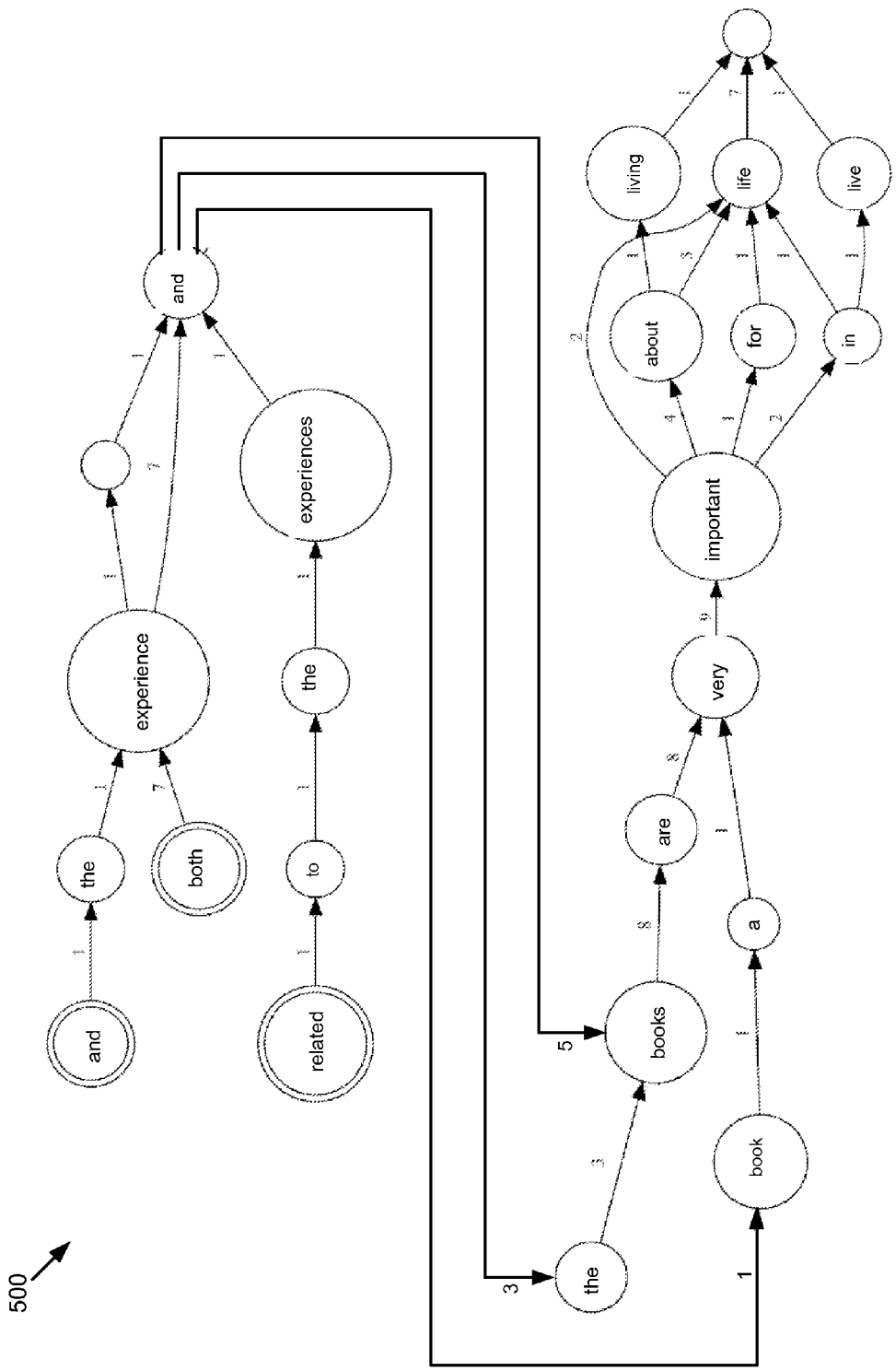
FIG. 5 depicts an example lattice including a first path and a plurality of nodes that have been added to the first path based on alignments between an original sentence and a plurality of back translations.

An example of a lattice including evidence from multiple back translations is illustrated in FIG. 5 and is described in greater detail below. FIG. 4, by contrast, illustrates an initial step in constructing such a lattice, and thus depicts the lattice 400 that includes evidence of a single back translation. It should be understood that the lattice 400 of FIG. 4 can be supplemented (as explained below with reference to FIG. 5) to generate the lattice that combines features of multiple back translations.

The example lattice 400 of FIG. 4 includes evidence of the single back translation, where the single back translation is the Russian back translation of FIG. 2 (i.e., "And the experience, and a very important book about life."). In constructing the example lattice 400 of FIG. 4, an alignment procedure is performed between the original sentence and the Russian back translation. In the example of FIG. 4, the original sentence is the original sentence of FIG. 2 (i.e., "Both experience and books are very important about living.") containing the one or more grammatical errors. Specifically, in performing the alignment procedure between the original sentence and the Russian back translation, for each unit of text in the original sentence, a corresponding unit of text is determined in the Russian back translation. An example of such an alignment between the original sentence and the Russian back translation is described above with reference to FIG. 3, where the original sentence 302 is the original sentence of FIG. 2, and the back translation 304 is the Russian back translation of FIG. 2.

Based on the alignment procedure between the original sentence and the Russian back translation, the lattice 400 is constructed. Specifically, in constructing the lattice 400, a first path of the lattice 400 (e.g., a "lattice backbone") is defined based on the original sentence. The first path includes nodes for units of text (e.g., words and punctuation marks) of the original sentence, and the nodes of the first path are connected in an order that maintains an order of the original sentence. The first path of FIG. 4 thus includes the set of connected nodes that form the original sentence, "Both experience and books are very important about living." Edges between the nodes of the first path are given a weight of "1."

To include features of the Russian back translation in the lattice 400, nodes are added to the lattice 400 based on the alignment procedure that is performed between the original sentence and the Russian back translation. Each added node defines an alternative unit of text for a corresponding node of the first path, where the alternative unit of text is taken from the Russian back translation, and where the corresponding node is determined based on the alignment procedure. To illustrate this, FIG. 4 includes a box 406, with the box 406 including a node 406a of the first path (i.e., the node 406a containing the word "both") and a node 406b that is added to the lattice 400 (i.e., the node 406b containing the word "the") based on the alignment procedure between the original sentence and the Russian back translation. The added node 406b thus defines an alternative unit of text ("the") to the unit of text ("both") of the original sentence. The alternative unit of text is included in the Russian back translation, and the correspondence between the nodes 406a, 406b is determined based on the alignment procedure between the original sentence and the Russian back translation. Specifically, with reference to FIG. 3, which depicts an example of this alignment procedure, the word "both" of the original sentence 302 is matched to the word "the" of the Russian back translation 304. The alternative units of text can be considered "parallel" units of text that define alternative paths through the lattice 400.

In this manner, after defining the first path that functions as the backbone of the lattice 400, nodes are added to the lattice 400 based on the alignment procedure between the original sentence and the Russian back translation. In an example, nodes are added to the lattice 400 in instances where the alignment procedure does not result in an identical match between the original sentence and the Russian back translation. With reference to FIG. 3, nodes are added to the lattice based on all edit operations 306 that are not identical matches. Thus, in an example, nodes are added to the lattice 400 based on the insertion, substitution, stemming, synonymy, and paraphrase operations described above, because such edit operations result in corresponding units of text in the original sentence and Russian back translation that do not exactly match.

With reference to both FIGS. 3 and 4, nodes are added for the units of text "and," "the," "[comma]," "book," "a," and "life" of the Russian back translation, because these units of text of the Russian back translation do not exactly match their corresponding units of text of the original sentence. As described above, such added nodes provide alternative formulations for the corresponding, aligned units of text of the first path. In an example, in instances where the alignment procedure results in an identical match between the original sentence and the Russian back translation, rather than creating a new, separate node, a node that would be created based on the Russian back translation is considered to be merged with the existing, matching node of the first path. In adding the nodes to the lattice 400 based on the alignment procedure, edges produced by the original sentence and the Russian back translation that connect same nodes are merged and their weights added. This is illustrated in the example lattice 400, where certain edges have weights of "2" based on the merging of the edges and the adding of the edges' weights.

FIG. 5 depicts an example lattice 500 including a first path and a plurality of nodes that have been added to the first path based on alignments between an original sentence and a plurality of back translations. In order to generate a correction for an original sentence that corrects the grammatical errors of the original sentence, evidence present in the multiple back translations may be combined via a lattice. FIG. 5 illustrates an example of such a lattice that includes evidence from multiple back translations. As described above, FIG. 4 illustrates the adding of nodes to the first path (e.g., the lattice backbone) based on the single back translation (i.e., the Russian back translation of FIG. 2), and FIG. 5 continues the example of FIG. 4 by adding nodes to the first path based on seven additional back translations (i.e., the Swedish, Italian, French, German, Chinese, Spanish, and Arabic back translations of FIG. 2).

For each of the seven additional back translations, nodes are added to the first path based on alignment procedures that are performed between the original sentence and each of the different back translations. Thus, for example, to add nodes to the first path based on the Swedish back translation, an alignment procedure similar to that described above for FIG. 3 is performed between the original sentence and the Swedish back translation. Nodes are then added to the first path in a manner similar to that described above for FIG. 4 (i.e., nodes are added to the lattice 500 in instances where the alignment procedure does not result in an identical match between the original sentence and the Swedish back translation). In adding the nodes to the lattice 500 based on the multiple alignment procedures, edges produced by different back translations that connect same nodes are merged and their weights added. This is illustrated in the example lattice 500, where certain edges have weights of "2" or higher based on the merging of the edges and the adding of the edges' weights.

The resulting lattice 500, after adding nodes based on each of the eight back translations of FIG. 2, thus includes features of each of the eight different back translations. As described in further detail below, with reference to FIG. 6, the lattice 500 includes a plurality of paths, where each path of the plurality of paths includes a set of connected nodes and edges that defines a candidate text sequence. The candidate text sequences include alternative grammatical options for the original sentence. In an example, the candidate text sequences represent the original sentence with one or more changes to correct the grammatical errors present in the original sentence. To determine a best candidate text sequence, the candidate text sequences may be ranked and scored based on an automated scoring system.

FIG. 6 depicts a plurality of candidate text sequences for an original sentence, where the original sentence includes one or more grammatical errors. As explained above, with reference to FIG. 1, an example system for correcting one or more grammatical errors in an original sentence outputs a plurality of candidate text sequences. The plurality of candidate text sequences include grammatical options for the original sentence and may be sentences that represent the original sentence with one or more changes to correct the one or more grammatical errors. The example system may utilize a lattice (e.g., the example lattice 500 of FIG. 5) that combines features of multiple different back translations to generate the candidate text sequences. Specifically, the lattice that combines features of the different back translations includes a plurality of paths through the lattice, where each path of the plurality of paths includes a set of connected nodes and edges that define a single candidate text sequence.

In determining the plurality of paths through the lattice that define the candidate text sequences, various statistical and non-statistical measures may be used. It should be appreciated that there may be many possible paths traversing a given lattice, and the number of possible paths may exceed the number of back translations carried out. In FIG. 6, a candidate text sequence denoted as being based on a "Greedy (G)" measure may be generated by traversing the lattice using a greedy best-first strategy at each node. In the greedy best-first strategy, at each node, an outgoing edge with a largest weight is followed. As illustrated in FIG. 6, the Greedy (G) measure generates the candidate text sequence, "Both experience and books are very important about life." Edge weights for the various nodes may be set according to any suitable approach such as described previously herein.

In FIG. 6, a candidate text sequence denoted as being based on a "1-best (1)" measure may be generated by determining a shortest path of the lattice. In an example, the shortest path of the lattice is determined using the OpenFST toolkit known to those of ordinary skill in the art. The OpenFST toolkit is a library for constructing, combining, and searching weighted finite-state transducers (FSTs), where a weighted finite-state transducer may include systems where each transition has an input label, an output label, and a weight. Finite-state transducers may be used to represent binary relations between pairs of strings, and the weights can be used to represent the cost of taking a particular transition. As such, the OpenFST toolkit may be used in the system described herein to determine the shortest path of the lattice. The 1-best (1) measure may assume, similar to the Greedy (G) measure, that the combined evidence from the different back translations present in the lattice is adequate to produce an acceptable correction of the original sentence and that no additional procedure is necessary to further evaluate the shortest path (e.g., a fluency of the shortest path is not evaluated to determine a sufficiency of the candidate text sequence defined by the shortest path). In an example, in using the 1-best (1) measure, edge weights in the lattice are converted into costs, where the conversion may be performed by multiplying the weights by −1. As illustrated in FIG. 6, the 1-best (1) measure generates the candidate text sequence, "Both experience and the books are very important about life."

A candidate text sequence denoted as being based on an "LM Re-ranked (L)" measure may be generated by first determining the twenty shortest paths of the lattice. In an example, the twenty shortest paths of the lattice comprise an n-best (n=20) list of paths through the lattice that are extracted using the OpenFST toolkit. After determining the twenty shortest paths of the lattice, the paths are ranked using an external metric. In an example, after determining the twenty shortest paths of the lattice, the twenty paths are scored (e.g., re-ranked) using a 5-gram language model trained on the English gigaword corpus, where the 5-gram language model may be configured to determine a fluency score for each of the sentences that correspond to the twenty paths. The path with the highest score (or rank) is extracted as the correction of the original sentence. The LM Re-ranked (L) measure assumes that an external method of evaluating paths of the lattice (e.g., an external method of evaluating a fluency of the sentences corresponding to the various paths) can help to determine a candidate text sequence that best corrects the grammatical errors of the original sentence. As illustrated in FIG. 6, the LM Re-ranked (L) measure generates the candidate text sequence, "And the experience and the books are very important in life."

In FIG. 6, a candidate text sequence denoted as being based on a "Product Re-ranked (P)" measure may be generated in a manner that is the same as the LM Re-ranked (L) measure described above, except that the re-ranking is performed based on a product of i) a length of each path (e.g., a cost of each hypothesis in the n-best (n=20) list of paths through the lattice), and ii) a ranking or score for the path that is generated via an external metric (e.g., a fluency score for the path that is generated via the 5-gram language model). Thus, in the Product Re-ranked (P) measure, the evidence from the back translations (e.g., evidence regarding path lengths) and the evidence from the external metric (e.g., the evidence related to the fluency scores generated by the 5-gram language model) are weighted equally. Specifically, under the Product Re-ranked (P) measure, the n-best paths (e.g., twenty shortest paths) of the lattice may be extracted using the OpenFST toolkit, and the n-best paths may thereafter be ranked based on the product described above. As illustrated in FIG. 6, the Product Re-ranked (P) measure generates the candidate text sequence, "Both experience and books are very important about life."

A candidate text sequence denoted as being based on a "LM Composition (C)" measure may be generated by first converting edge weights of the lattice to probabilities. The lattice is then composed with a tri-gram finite state language model, where the tri-gram finite state language model is trained on a corpus of 100,000 high-scoring student essays in an example. The shortest path through the composed lattice is then extracted as the candidate text sequence. The LM Composition (C) measure assumes that using the n-gram language model during the actual search process is better than using the n-gram language model as a post-processing tool on an already-extracted n-best list (e.g., as may be used in the LM Re-ranked (L) and Product Re-ranked (P) measures). As illustrated in FIG. 6, the Full LM Composition (C) measure generates the candidate text sequence, "Both experience and books are very important in life." The candidate text sequence generated by the LM Composition (C) measure corrects the one or more grammatical errors of the original sentence in the example of FIG. 6.

As is further illustrated in the example of FIG. 6, a baseline candidate text sequence may be determined to be a most fluent back translation of the multiple different back translations generated. For instance, in the example of FIGS. 2-5, where the eight back translations are generated using the eight different pivot languages, the Russian back translation (e.g., "And the experience, and a very important book about life," as illustrated in the example "Baseline" correction of FIG. 6) may be determined to be the most fluent back translation as measured by a 5-gram language model trained on the English gigaword corpus. Thus, in this example, the determination of the baseline candidate text sequence does not require use of the lattice, in contrast to the Greedy (G), 1-best (1), LM Re-ranked (L), Product Re-ranked (P), and LM Composition (C) measures described above.

After determining the candidate text sequences in the manner described above, the computer-based system may automatically score the candidate text sequences using a scoring model as described previously herein. As mentioned previously, one or more of the highest scoring candidate text sequences may be chosen as a most likely corrected version(s) of the original text sequence.

In another example, the system and approaches described herein for correcting grammatical errors in sentences may be combined with spelling correction and focused translation to improve identification of candidate text sequences and scoring. In this regard, before a sentence is received by the system for correcting grammatical errors, spelling mistakes (e.g., spelling mistakes that do not result in a real word) may be corrected via an automated spelling correction technique. Further, in another example, before a sentence is received by the example system for correcting grammatical errors, an error detection system (or a human) may first identify portions of the sentence that contain grammatical errors so that selective machine translation can be used to only translate the text containing errors, while still retaining the rest of the words in the sentence. This approach may help to minimize the introduction of new grammatical errors in portions of the sentence that did not originally include grammatical errors.

As an alternative to the selective translation technique described above, portions of the sentence including grammatical errors can be extracted, and these extracted portions can then be subject to the round-trip translation procedure individually (i.e., only the extracted portions of the sentence are translated, and the sentence as a whole is not translated or received by the machine translation system). As an example of this, an original sentence may read: "Most of all, luck is no use without a hard work." In the original sentence, the preposition "of" is omitted prior to the word "no," and there is an extraneous article "a" before "hard work." Using the alternative approach described here, the machine translation system can be provided with the two phrasal spans of the original sentence containing the errors, instead of the entire original sentence.

Figure 7:
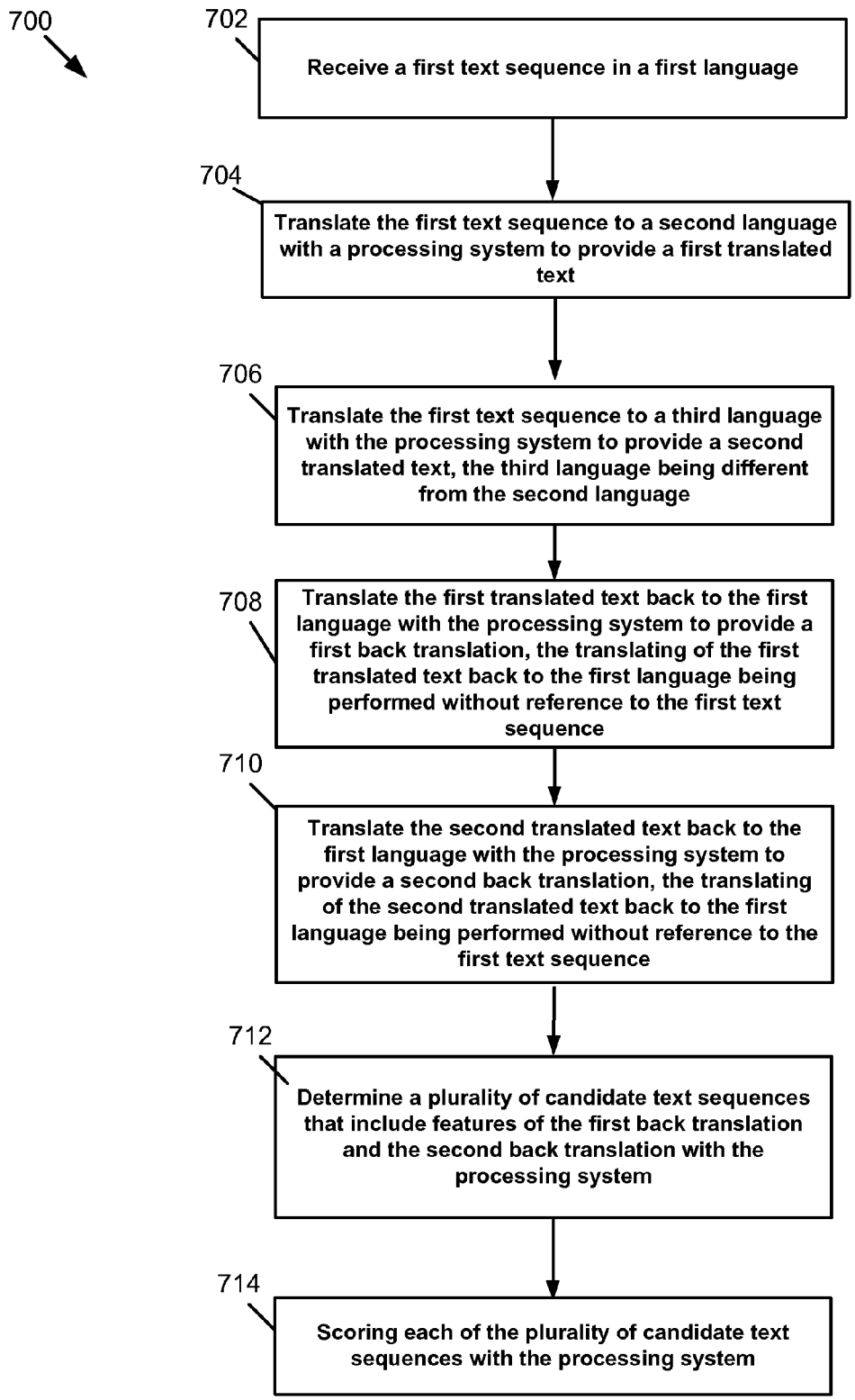
FIG. 7 is a flowchart depicting operations of an example computer-implemented method of correcting a grammatical error in a text sequence.

FIG. 7 is a flowchart 700 depicting operations of an example computer-implemented method of correcting a grammatical error in a text sequence. At 702, a first text sequence in a first language is received. At 704, the first text sequence is translated to a second language with a processing system to provide a first translated text. At 706, the first text sequence is translated to a third language with the processing system to provide a second translated text, where the third language is different from the second language. At 708, the first translated text is translated back to the first language with the processing system to provide a first back translation. The translating of the first translated text back to the first language is performed without reference to the first text sequence. At 710, the second translated text is translated back to the first language with the processing system to provide a second back translation. The translating of the second translated text back to the first language is performed without reference to the first text sequence. At 712, a plurality of candidate text sequences that include features of the first back translation and the second back translation are determined with the processing system. The plurality of candidate text sequences include alternative grammatical options for the first text sequence. At 714, each of the plurality of candidate text sequences is scored with the processing system, where the scoring provides a measure of a grammaticality of each of the candidate text sequences.

In an example, the system for correcting grammatical errors described herein serves as a "front end" of a natural language processing (NLP) system. For example, an NLP system configured to score text sequences based on content may perform best with input that does not include grammatical errors. In such an NLP system, the example system described herein may be applied to correct grammatical errors in text received at the NLP system as a pre-processing step, thus improving the NLP system's ability to score the text based on the text's content.

Figure 8A:
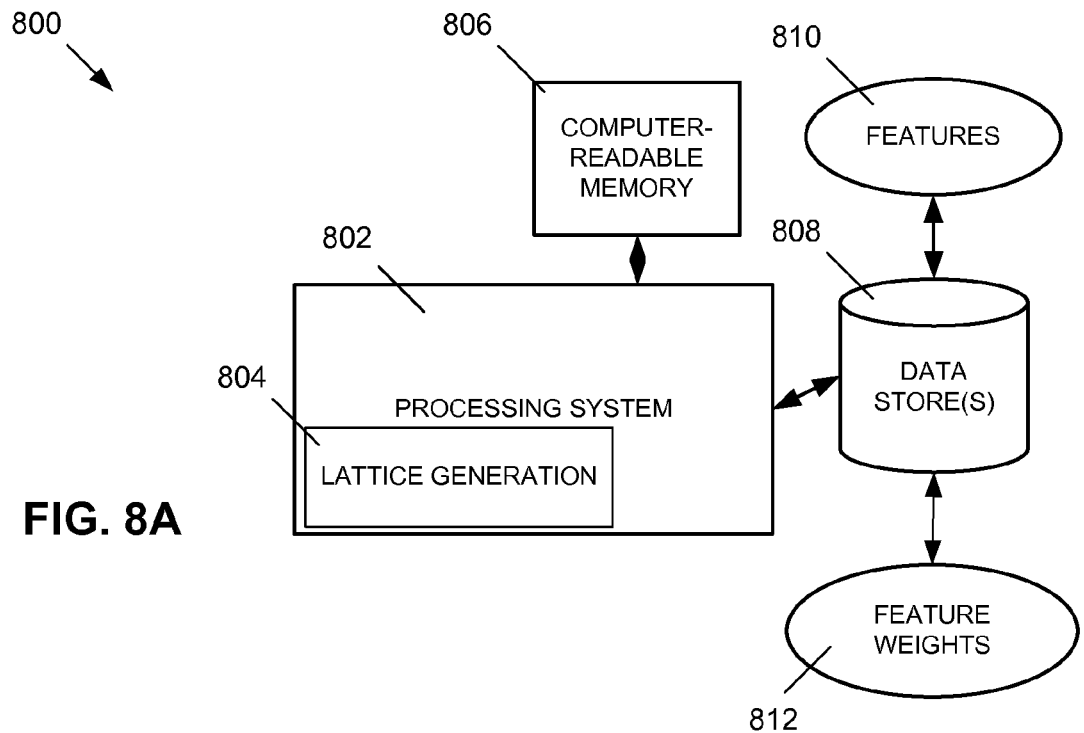
FIGS. 8A, 8B, and 8C depict example systems for correcting a grammatical error in a text sequence.
Figure 8B:
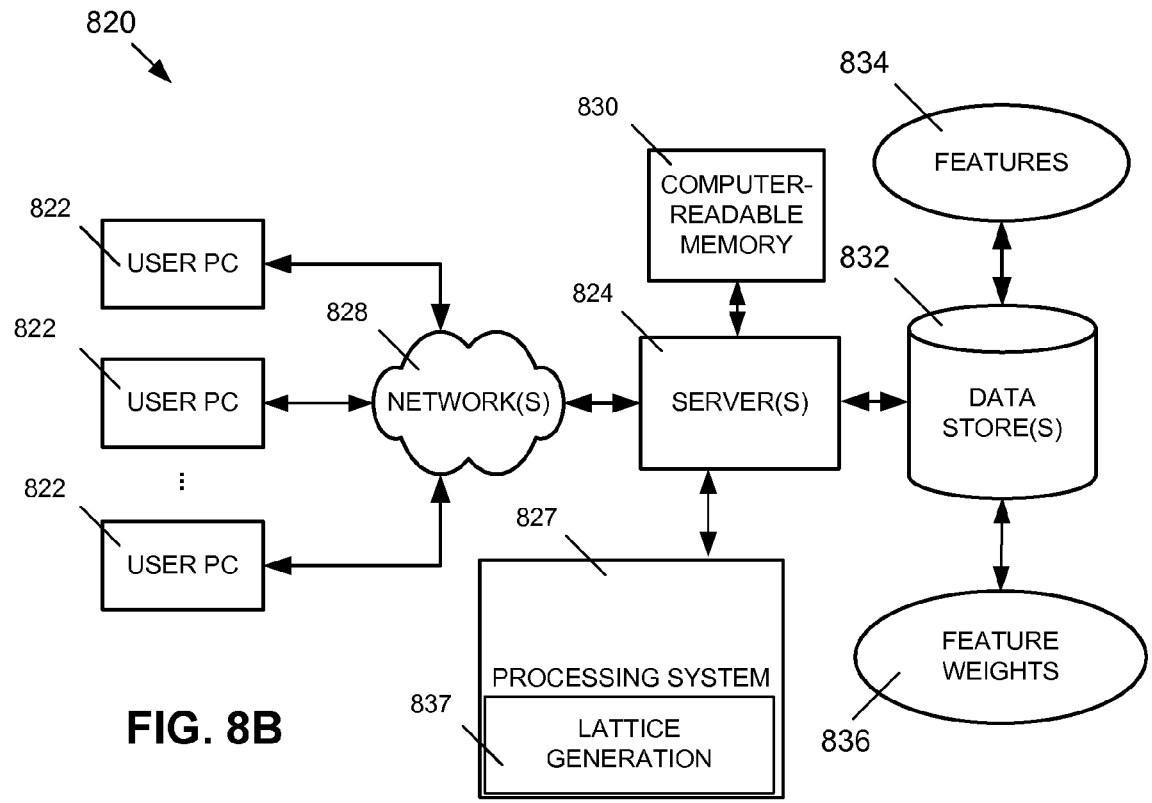
Figure 8C:
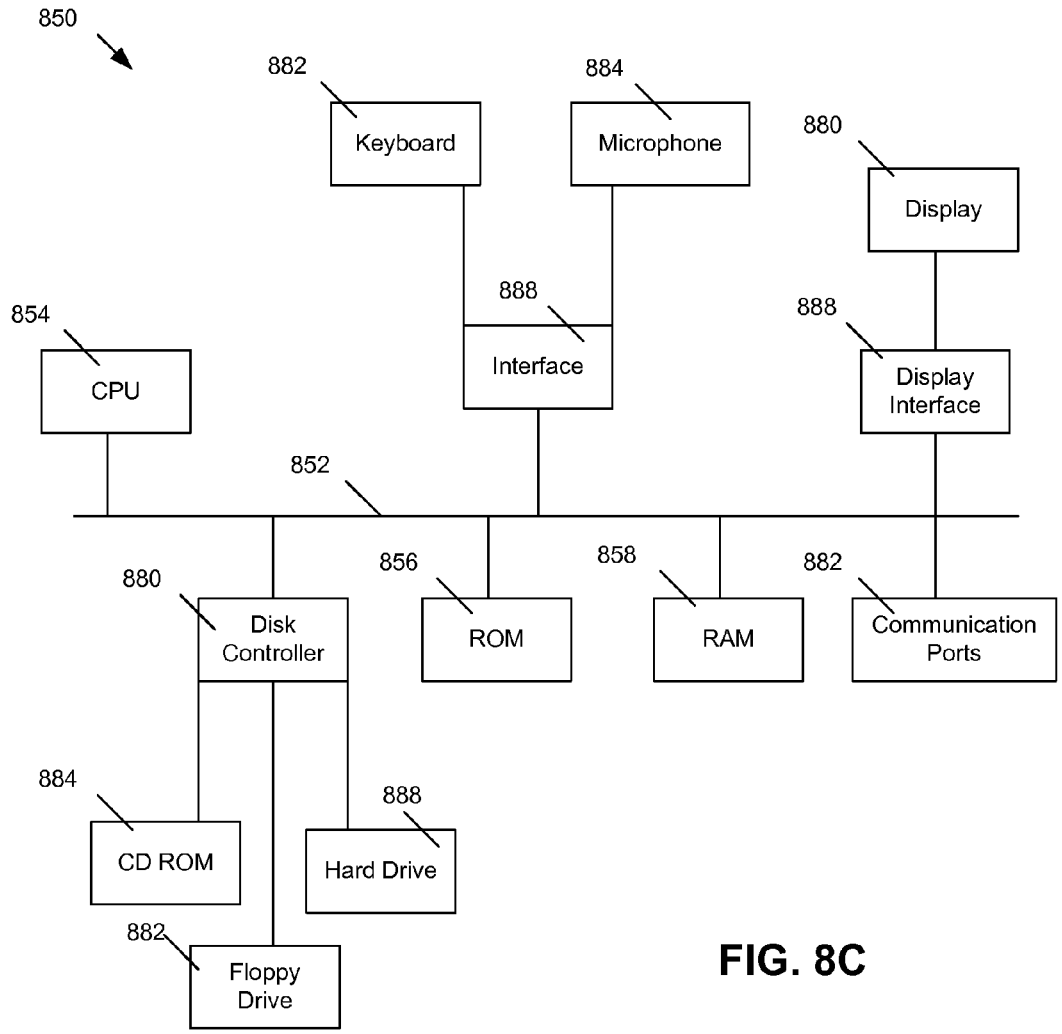

FIGS. 8A, 8B, and 8C depict example systems for correcting a grammatical error in a text sequence. For example, FIG. 8A depicts an exemplary system 800 that includes a standalone computer architecture where a processing system 802 (e.g., one or more computer processors located in a given computer or in multiple computers that may be separate and distinct from one another) includes a lattice generation module 804 being executed on the processing system 802. The processing system 802 has access to a computer-readable memory 806 in addition to one or more data stores 808. The one or more data stores 808 may include features 810 as well as feature weights 812 (e.g., features and feature weights used in assigning a score to candidate text sequences, as described above). The processing system 802 may be a distributed parallel computing environment, which may be used to handle very large-scale data sets.

FIG. 8B depicts a system 820 that includes a client-server architecture. One or more user PCs 822 access one or more servers 824 running a lattice generation module 837 on a processing system 827 via one or more networks 828. The one or more servers 824 may access a computer-readable memory 830 as well as one or more data stores 832. The one or more data stores 832 may include features 834 as well as feature weights 836.

FIG. 8C shows a block diagram of exemplary hardware for a standalone computer architecture 850, such as the architecture depicted in FIG. 8A that may be used to contain and/or implement the program instructions of system embodiments of the present disclosure. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 856 and random access memory (RAM) 858, may be in communication with the processing system 854 and may contain one or more programming instructions for performing the method for correcting a grammatical error in a text sequence. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 806, 830, 856, 858 or data stores 808, 832, 862, 864, 866 may include one or more data structures for storing and associating various data used in the example systems for correcting a grammatical error in a text sequence. For example, a data structure stored in any of the aforementioned locations may be used to relate a first translated text with a first back translation of the first translated text. As another example, a data structure may be used to relate candidate text sequences with scores assigned to the candidate text sequences. Other aspects of the example systems for correcting a grammatical error in a text sequence may be stored and associated in the one or more data structures (e.g., lattices generated by a lattice generation module, etc.).

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. The processor 854 may access one or more components as required.

A display interface 868 may permit information from the bus 852 to be displayed on a display 870 in audio, graphic, or alphanumeric format. Communication with external devices may optionally occur using various communication ports 872.

In addition to these computer-type components, the hardware may also include data input devices, such as a keyboard 873, or other input device 874, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for correcting a grammatical error in a text sequence, the computer-implemented method comprising:
    translating a first text sequence in a first language to a second language with a processing system using a first machine translation algorithm to provide a first translated text;
    translating the first text sequence to a third language with the processing system using a second machine translation algorithm to provide a second translated text, the third language being different from the second language;
    translating the first translated text back to the first language with the processing system using a third machine translation algorithm to provide a first back translation, the translating of the first translated text back to the first language being performed without reference to the first text sequence;

translating the second translated text back to the first language with the processing system using a fourth machine translation algorithm to provide a second back translation, the translating of the second translated text back to the first language being performed without reference to the first text sequence;

determining a plurality of candidate text sequences that include features of the first back translation and the second back translation with the processing system, the plurality of candidate text sequences including alternative grammatical options for the first text sequence; and scoring each of the plurality of candidate text sequences using a computer based scoring model with the processing system, the scoring providing a measure of a grammaticality of each of the candidate text sequences, wherein a computer-readable memory is encoded with instructions for commanding the processing system to execute the first, second, third, and fourth machine translation algorithms and to execute the determining of the plurality of candidate text sequences and the scoring of each of the plurality of candidate text sequences.

2. The computer-implemented method of claim 1, wherein the plurality of candidate text sequences include at least one candidate text sequence that is equivalent to neither the first back translation nor the second back translation.

3. The computer-implemented method of claim 1, wherein the determining of the plurality of candidate text sequences includes:

for each unit of text in the first text sequence,
  i) determining a first corresponding unit of text in the first back translation, the determining of the first corresponding unit of text comprising a first alignment, and
  ii) determining a second corresponding unit of text in the second back translation, the determining of the second corresponding unit of text comprising a second alignment.

4. The computer-implemented method of claim 3, wherein the determining of the plurality of candidate text sequences includes:

constructing a lattice that includes the features of the first back translation and the second back translation, the constructing of the lattice including:
  defining a first path of the lattice based on the first text sequence, the first path including nodes for units of text of the first text sequence, and
  adding a node to the lattice, wherein the added node provides an alternative unit of text for a corresponding node of the first path, the alternative unit of text being included in the first back translation or the second back translation, and the corresponding node of the first path being determined based on the first alignment or the second alignment; and
determining a plurality of paths through the lattice to determine the plurality of candidate text sequences.

5. The computer-implemented method of claim 4, wherein the determining of the plurality of paths through the lattice includes:

determining a first path through the lattice by selecting at each node of the lattice an outgoing edge with a largest weight;
determining a second path through the lattice that is a shortest path through the lattice; and
determining a third path through the lattice based on a fluency measure, the fluency measure indicating a fluency of a candidate text sequence that corresponds to the third path.

6. The computer-implemented method of claim 1, wherein the candidate text sequences are scored by applying the computer based scoring model to the candidate text sequences, the computer based scoring model being trained based on a plurality of text sequences that are scored by one or more humans or annotated by the one or more humans.

7. The computer-implemented method of claim 1,
wherein the first machine translation algorithm utilizes a first rule set or statistical model in translating the first text sequence from the first language to the second language;
wherein the second machine translation algorithm utilizes a second rule set or statistical model in translating the first text sequence from the first language to the third language;
wherein the third machine translation algorithm utilizes a third rule set or statistical model in translating the first translated text back to the first language; and
wherein the fourth machine translation algorithm utilizes a fourth rule set or statistical model in translating the second translated text back to the first language.

8. A system for correcting a grammatical error in a text sequence, the computer-implemented method comprising:

a processing system; and computer-readable memory in communication with the processing system encoded with instructions for commanding the processing system to execute steps comprising:

receiving a first text sequence in a first language;

translating the first text sequence to a second language with the processing system using a first machine translation algorithm to provide a first translated text;

translating the first text sequence to a third language with the processing system using a second machine translation algorithm to provide a second translated text, the third language being different from the second language;

translating the first translated text back to the first language with the processing system using a third machine translation algorithm to provide a first back translation, the translating of the first translated text back to the first language being performed without reference to the first text sequence;

translating the second translated text back to the first language with the processing system using a fourth machine translation algorithm to provide a second back translation, the translating of the second translated text back to the first language being performed without reference to the first text sequence;

determining a plurality of candidate text sequences that include features of the first back translation and the second back translation with the processing system, the plurality of candidate text sequences including alternative grammatical options for the first text sequence; and scoring each of the plurality of candidate text sequences using a computer based scoring model with the processing system, the scoring providing a measure of a grammaticality of each of the candidate text sequences.

9. The system of claim 8, wherein the plurality of candidate text sequences include at least one candidate text sequence that is equivalent to neither the first back translation nor the second back translation.

10. The system of claim 8, wherein the determining of the plurality of candidate text sequences includes:
for each unit of text in the first text sequence,
i) determining a first corresponding unit of text in the first back translation, the determining of the first corresponding unit of text comprising a first alignment, and
ii) determining a second corresponding unit of text in the second back translation, the determining of the second corresponding unit of text comprising a second alignment.

11. The system of claim 10, wherein the determining of the plurality of candidate text sequences includes:
constructing a lattice that includes the features of the first back translation and the second back translation, the constructing of the lattice including:
defining a first path of the lattice based on the first text sequence, the first path including nodes for units of text of the first text sequence, and
adding a node to the lattice, wherein the added node provides an alternative unit of text for a corresponding node of the first path, the alternative unit of text being included in the first back translation or the second back translation, and the corresponding node of the first path being determined based on the first alignment or the second alignment; and
determining a plurality of paths through the lattice to determine the plurality of candidate text sequences.

12. The system of claim 11, wherein the determining of the plurality of paths through the lattice includes:
determining a first path through the lattice by selecting at each node of the lattice an outgoing edge with a largest weight;
determining a second path through the lattice that is a shortest path through the lattice; and
determining a third path through the lattice based on a fluency measure, the fluency measure indicating a fluency of a candidate text sequence that corresponds to the third path.

13. The system of claim 8, wherein the candidate text sequences are scored by applying the computer based scoring model to the candidate text sequences, the computer based scoring model being trained based on a plurality of text sequences that are scored by one or more humans or annotated by the one or more humans.

14. The system of claim 8,
wherein the first machine translation algorithm utilizes a first rule set or statistical model in translating the first text sequence from the first language to the second language;
wherein the second machine translation algorithm utilizes a second rule set or statistical model in translating the first text sequence from the first language to the third language;
wherein the third machine translation algorithm utilizes a third rule set or statistical model in translating the first translated text back to the first language; and
wherein the fourth machine translation algorithm utilizes a fourth rule set or statistical model in translating the second translated text back to the first language.

15. A non-transitory computer-readable storage medium for correcting a grammatical error in a text sequence, the computer-readable storage medium comprising computer executable instructions which, when executed, cause a processing system to execute steps comprising:

receiving a first text sequence in a first language;
translating the first text sequence to a second language with the processing system using a first machine translation algorithm to provide a first translated text;
translating the first text sequence to a third language with the processing system using a second machine translation algorithm to provide a second translated text, the third language being different from the second language;
translating the first translated text back to the first language with the processing system using a third machine translation algorithm to provide a first back translation, the translating of the first translated text back to the first language being performed without reference to the first text sequence;
translating the second translated text back to the first language with the processing system using a fourth machine translation algorithm to provide a second back translation, the translating of the second translated text back to the first language being performed without reference to the first text sequence;
determining a plurality of candidate text sequences that include features of the first back translation and the second back translation with the processing system, the plurality of candidate text sequences including alternative grammatical options for the first text sequence; and
scoring each of the plurality of candidate text sequences using a computer based scoring model with the processing system, the scoring providing a measure of a grammaticality of each of the candidate text sequences.

16. The non-transitory computer-readable storage medium of claim 15, wherein the plurality of candidate text sequences include at least one candidate text sequence that is equivalent to neither the first back translation nor the second back translation.

17. The non-transitory computer-readable storage medium of claim 15, wherein the determining of the plurality of candidate text sequences includes:
for each unit of text in the first text sequence,
i) determining a first corresponding unit of text in the first back translation, the determining of the first corresponding unit of text comprising a first alignment, and
ii) determining a second corresponding unit of text in the second back translation, the determining of the second corresponding unit of text comprising a second alignment.

18. The non-transitory computer-readable storage medium of claim 17, wherein the determining of the plurality of candidate text sequences includes:
constructing a lattice that includes the features of the first back translation and the second back translation, the constructing of the lattice including:
defining a first path of the lattice based on the first text sequence, the first path including nodes for units of text of the first text sequence, and
adding a node to the lattice, wherein the added node provides an alternative unit of text for a corresponding node of the first path, the alternative unit of text being included in the first back translation or the second back translation, and the corresponding node of the first path being determined based on the first alignment or the second alignment; and
determining a plurality of paths through the lattice to determine the plurality of candidate text sequences.

19. The non-transitory computer-readable storage medium of claim 18, wherein the determining of the plurality of paths through the lattice includes:
 determining a first path through the lattice by selecting at each node of the lattice an outgoing edge with a largest weight;
 determining a second path through the lattice that is a shortest path through the lattice; and
 determining a third path through the lattice based on a fluency measure, the fluency measure indicating a fluency of a candidate text sequence that corresponds to the third path.

20. The non-transitory computer-readable storage medium of claim 15, wherein the candidate text sequences are scored by applying the computer based scoring model to the candidate text sequences, the computer based scoring model being trained based on a plurality of text sequences that are scored by one or more humans or annotated by the one or more humans.

21. The non-transitory computer-readable storage medium of claim 15,
 wherein the first machine translation algorithm utilizes a first rule set or statistical model in translating the first text sequence from the first language to the second language;
 wherein the second machine translation algorithm utilizes a second rule set or statistical model in translating the first text sequence from the first language to the third language;
 wherein the third machine translation algorithm utilizes a third rule set or statistical model in translating the first translated text back to the first language; and
 wherein the fourth machine translation algorithm utilizes a fourth rule set or statistical model in translating the second translated text back to the first language.

\* \* \* \* \*